US012614794B2

(12) United States Patent
You et al.

(10) Patent No.: US 12,614,794 B2
(45) Date of Patent: Apr. 28, 2026

(54) SECONDARY BATTERY AND FABRICATING METHOD THEREFOR

(71) Applicant: SAMSUNG SDI CO., LTD., Yongin-si (KR)

(72) Inventors: Hee Chul You, Yongin-si (KR); Hyang Mi Cho, Yongin-si (KR); Hoon Kang, Yongin-si (KR); Jin Nam Kim, Yongin-si (KR); Jong Hoon Lee, Yongin-si (KR); Min Hyeong Hwang, Yongin-si (KR); Yu Seong Cho, Yongin-si (KR); Young Tae Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 643 days.

(21) Appl. No.: 17/986,967

(22) Filed: Nov. 15, 2022

(65) Prior Publication Data

US 2023/0155224 A1 May 18, 2023

(30) Foreign Application Priority Data

Nov. 16, 2021 (KR) ......................... 10-2021-0157780

(51) Int. Cl.
*H01M 50/00* (2021.01)
*H01M 4/04* (2006.01)
(Continued)

(52) U.S. Cl.
CPC ....... *H01M 50/186* (2021.01); *H01M 4/0404* (2013.01); *H01M 4/661* (2013.01); *H01M 50/536* (2021.01)

(58) Field of Classification Search
CPC ........ H01M 50/186; H01M 4/04; H01M 4/66; H01M 50/536; Y02E 60/10
See application file for complete search history.

(56) References Cited

U.S. PATENT DOCUMENTS

| | | | |
|---|---|---|---|
| 9,159,505 B2 | 10/2015 | Yoshitake et al. | |
| 11,031,621 B2 | 6/2021 | Guen | |

(Continued)

FOREIGN PATENT DOCUMENTS

| | | | | |
|---|---|---|---|---|
| CN | 105772939 A | * | 7/2016 | |
| CN | 107649784 A | * | 2/2018 | ........... B23K 26/064 |

(Continued)

OTHER PUBLICATIONS

Byun et al., Secondary Battery Having Cathode Terminal-Integrated Cap Plate, Dec. 2018. See the Abstract. (Year: 2018).*

(Continued)

*Primary Examiner* — Tiffany Legette
*Assistant Examiner* — Monique M Wills
(74) *Attorney, Agent, or Firm* — Lee IP Law, P.C.

(57) ABSTRACT

A secondary battery includes an electrode assembly, a current collector coupled to the electrode assembly, a case accommodating the electrode assembly and the current collector, a cap plate coupled to the case, the cap plate sealing the electrode assembly and the current collector in the case, and a terminal plate connected to the current collector, the terminal plate being exposed through the cap plate, wherein the current collector is welded to at least one of the electrode assembly and the terminal plate by both a dual beam welding and a wobble welding.

20 Claims, 6 Drawing Sheets

(51) Int. Cl.
_H01M 4/66_ (2006.01)
_H01M 50/186_ (2021.01)
_H01M 50/536_ (2021.01)

(56) References Cited

U.S. PATENT DOCUMENTS

| | | | |
|---|---|---|---|
| 2006/0024573 | A1 | 2/2006 | Yim et al. |
| 2008/0251504 | A1 | 10/2008 | Lu et al. |
| 2013/0052531 | A1 | 2/2013 | Yoshitake et al. |
| 2018/0141156 | A1 | 5/2018 | Tsukui et al. |
| 2018/0183020 | A1 | 6/2018 | Ju et al. |
| 2018/0236605 | A1 | 8/2018 | Finuf et al. |
| 2020/0280028 | A1 | 9/2020 | Ehara et al. |
| 2021/0175567 | A1 | 6/2021 | Kim et al. |
| 2021/0280952 | A1 | 9/2021 | Wakimoto et al. |
| 2021/0299785 | A1 | 9/2021 | Närhi et al. |
| 2021/0320363 | A1 * | 10/2021 | Kim .................... H01M 10/045 |

FOREIGN PATENT DOCUMENTS

| | | | | |
|---|---|---|---|---|
| CN | 109088040 | A | 12/2018 | |
| CN | 113070573 | A | 7/2021 | |
| JP | 2005-285406 | A | 10/2005 | |
| JP | 2009-127075 | A | 6/2009 | |
| JP | 2013-065552 | A | 4/2013 | |
| JP | 2016-143656 | A | 8/2016 | |
| JP | 2019-206013 | A | 12/2019 | |
| JP | 2020-140887 | A | 9/2020 | |
| KR | 10-2018-0020129 | A | 2/2018 | |
| KR | 10-2019-0016691 | A | 2/2019 | |
| KR | 10-2019-0119616 | A | 10/2019 | |
| WO | WO 2018/216533 | A | 11/2018 | |
| WO | WO-2018221853 | A1 * | 12/2018 | ........ H01M 10/0413 |

OTHER PUBLICATIONS

Gao et al., for welding power battery double-beam laser welding apparatus and method, Feb. 2018. See the Abstract. (Year: 2018).*
Chen et al., Dual beam laser welding device comprises beam splitter and laser scanning unit, where beam splitter is used to transfer initial laser beam into first beam and second beam and emission direction is along direction of swinging light beam, Jul. 2016. See the Abstract. (Year: 2016).*
Japanese Notice of Allowance dated Dec. 25, 2023, of the Japanese Patent Application No. 2022-182728.
European Search Report dated May 8, 2023 of the European Patent Application No. 22206752.2.
Notice of Allowance dated Nov. 7, 2023, of the Taiwanese Patent Application No. 111143567 corresponding to this application.
Chinese Office action dated Aug. 23, 2025.

* cited by examiner

300b

300a

SECONDARY BATTERY AND FABRICATING METHOD THEREFOR

CROSS-REFERENCE TO RELATED APPLICATION

This application claims priority to and the benefit of Korean Patent Application No. 10-2021-0157780, filed on Nov. 16, 2021, in the Korean Intellectual Property Office, the contents of which in its entirety are herein incorporated by reference.

BACKGROUND

1. Field

The present disclosure relates to a secondary battery capable of increasing welding quality.

2. Description of the Related Art

A secondary battery is a power storage system that converts electrical energy into chemical energy and stores the converted energy to provide high energy density. Unlike primary batteries that cannot be recharged, a secondary battery is rechargeable and is being widely used in electronic devices, e.g., a smart phone, a cellular phone, a notebook computer, or a tablet PC.

In recent years, electric vehicles are drawing attention for prevention of environmental contamination, and a trend toward the use of high-capacity secondary batteries for electric vehicles is growing. The secondary battery needs to have high density, high output, and high stability characteristics.

SUMMARY

A secondary battery according to the present disclosure may include an electrode assembly; a current collector coupled to the electrode assembly; a case in which the electrode assembly is accommodated; a cap plate coupled to the case to seal the electrode assembly and the current collector; and a terminal plate connected to the current collector and exposed through the cap plate, wherein dual beam and wobble welding may be performed on at least one of between the electrode assembly and the current collector and between the current collector and the terminal plate.

The dual beam used for welding may include a first region formed at the center and a second region formed around the first region.

In addition, the first region of the dual beam may have a circular shape, and the second region may have a ring shape.

In addition, the wobble welding may be performed along the second region.

In addition, the wobble welding may be performed along the edge of the dual beam while forming repeated arcs.

In addition, the wobble welding may include wave beads having a repeated sawtooth shape.

In addition, in the sawtooth shape, a diameter difference between the outer sawtooth portion (A) and the inner sawtooth portion (B) may be greater than or equal to 5 μm.

In addition, dual beam and wobble welding may be further performed on the coupling between the case and the cap plate.

In addition, at least one of the electrode assembly and the current collector and the current collector and the terminal plate may be made of a dissimilar metal to perform welding.

A method of fabricating a secondary battery may include forming an electrode assembly, forming a current collector to be coupled to the electrode assembly, accommodating the electrode assembly and the current collector in a case, forming a cap plate sealing the case, such that the electrode assembly and the current collector are inside the case, and forming a terminal plate to be connected to the current collector, such that the terminal plate extends through the cap plate to be exposed to an exterior of the case, wherein the current collector is welded to at least one of the electrode assembly and the terminal plate by both a dual beam welding and a wobble welding.

BRIEF DESCRIPTION OF DRAWINGS

Features will become apparent to those of skill in the art by describing in detail exemplary embodiments with reference to the attached drawings, in which.

DETAILED DESCRIPTION

Figure 1:
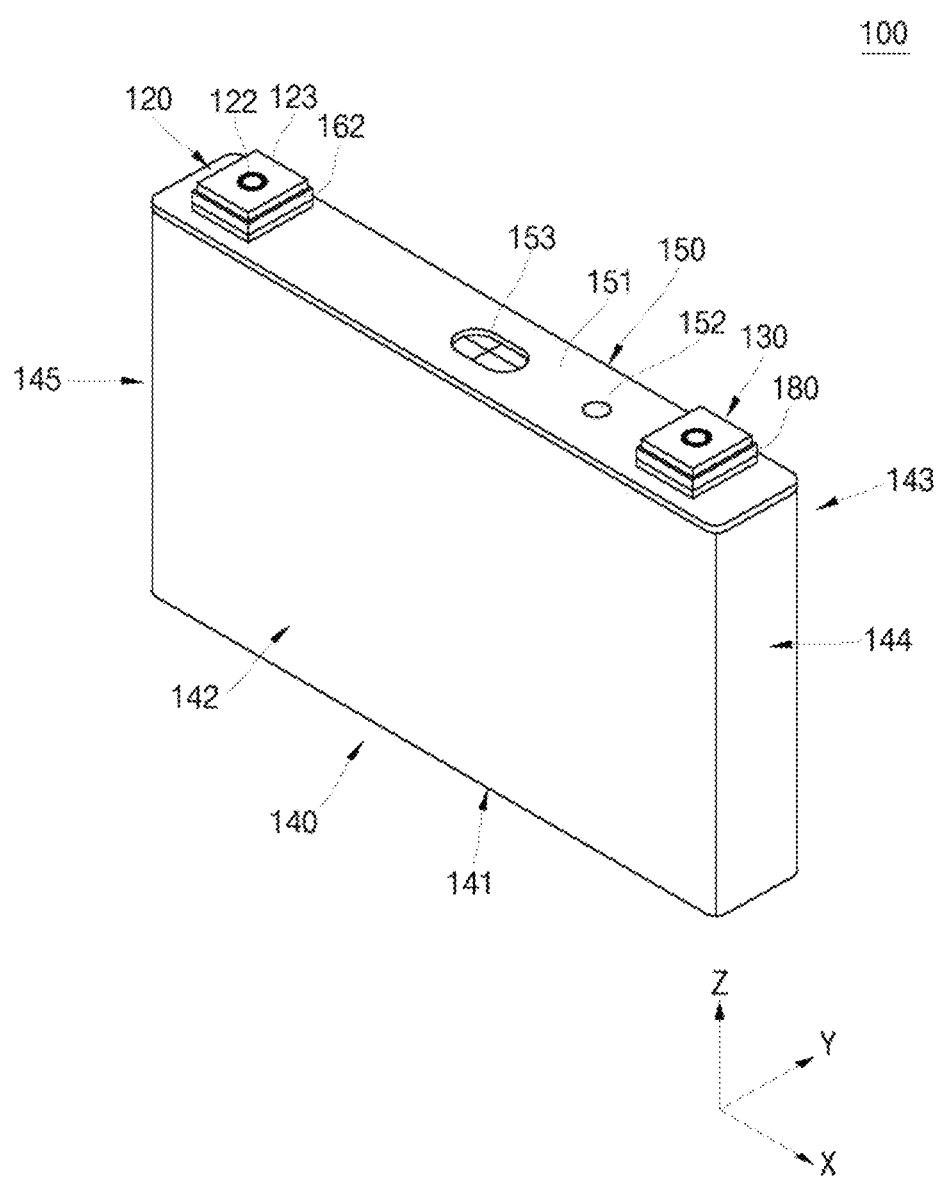
FIG. 1 is a perspective view showing a secondary battery according to an embodiment of the present disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the term "and/or" includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

Figure 2:
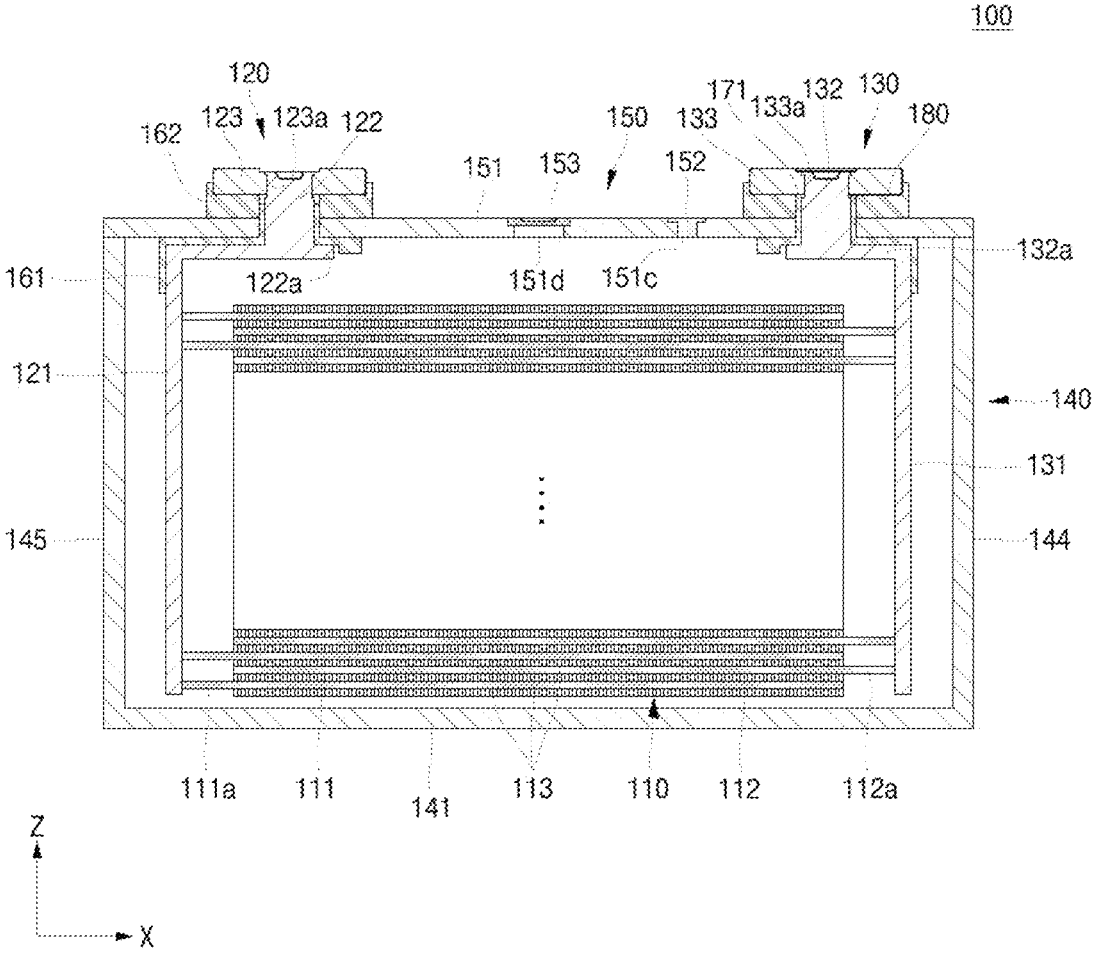
FIG. 2 is a cross-sectional view showing a secondary battery according to an embodiment of the present disclosure.

FIG. 1 is a perspective view showing an exemplary secondary battery according to an embodiment of the present disclosure. FIG. 2 is a cross-sectional view of the secondary battery in FIG. 1.

Referring to FIGS. 1 and 2, a secondary battery 100 may include an electrode assembly 110, a first terminal 120, a second terminal 130, a case 140, and a cap assembly 150. The electrode assembly 110 may be accommodated in the case 140.

In detail, the first and second terminals 120 and 130 may penetrate through the cap assembly 150 and be exposed upwardly. In some examples, the first terminal 120 may include or be referred to as a negative electrode terminal, and the second terminal 130 may include or be referred to as a positive electrode terminal.

In some examples, an upper insulating member 162 may be interposed between the first terminal 120 and the cap assembly 150, and a connecting member 180 may be interposed between the second terminal 130 and the cap assembly 150. Therefore, the first terminal 120 and the cap assembly 150 may be electrically insulated, e.g., separated, from each other. In addition, when the connecting member 180 is made of a conductive material, the second terminal 130 and the cap assembly 150 may be electrically connected, e.g., coupled, to each other, in which case, the case 140 may be charged with the polarity of the second terminal 130, e.g., with a positive polarity In some examples, the case 140 may be formed by a deep drawing process using a metal plate or a bending and welding process using a metal plate. In addition, the case 140 has a space in which the electrode assembly 110 and the cap assembly 150 to be seated are accommodated, and may be in the form of a hexahedron. In some examples, the case 140 may include a rectangular bottom portion 141 having long sides and short sides, long side portions 142 and 143 bent and extending from the long sides of the bottom portion 141 toward the cap assembly 150, and short side portions 144 and 145 extending from the short sides of the bottom portion 141 toward the cap assembly 150. In some examples, the case 140 may include or be referred to as a case, a housing, or an exterior material.

In some examples, the cap assembly 150 may include a cap plate 151, a plug 152, and a safety vent 153. This will be explained in more detail below.

As shown in FIG. 2, the electrode assembly 110 may have a winding axis in the horizontal direction (i.e., a direction substantially parallel to the longitudinal direction of the cap assembly 150). In some examples, the electrode assembly 110 may include a stack type as well as a winding type.

The electrode assembly 110 may be formed by winding or overlapping a stack of a first electrode plate 111, a separator 113, a second electrode plate 112, which are formed in a thin plate shape or a film shape. For example, the first electrode plate 111 can act as a negative electrode, and the second electrode plate 112 can act as a positive electrode (e.g., the reverse is also possible).

In some examples, the first electrode plate 111 may be formed by coating a first electrode active material, e.g., graphite or carbon, on a first electrode current collector formed of a metal foil, e.g., copper, copper alloy, nickel or nickel alloy, and may include a first electrode uncoated portion 111a that is a region to which the first electrode active material is not applied. In some examples, the second electrode plate 112 may be formed by coating a second electrode active material, e.g., a transition metal oxide, on a second electrode current collector formed of a metal foil, e.g., aluminum or an aluminum alloy, and may include a second electrode uncoated portion 112a that is a region to which the second electrode active material is not applied.

In some examples, the separator 113 is positioned between the first electrode plate 111 and the second electrode plate 112 to prevent a short circuit and enable the movement of lithium ions, and may include, e.g., polyethylene, polypropylene, or a composite film of polyethylene and polypropylene. For example, the separator 113 may include a functional film in which an inorganic material layer is coated on a porous polymer film. For example, the separator 113 may be replaced with an inorganic solid electrolyte, e.g., a sulfide-based, oxide-based or phosphate-based electrolyte, that does not require an electrolyte in a liquid or gel state.

The first terminal 120 and the second terminal 130 may be electrically connected to the first electrode plate 111 and the second electrode plate 112, respectively, and may be positioned at both, e.g., opposite, ends of the electrode assembly 110. In some examples, the electrode assembly 110 may be accommodated in the case 140 together with an electrolyte. For example, the electrolyte may include a lithium salt, e.g., $LiPF_6$, in an organic solvent, e.g., ethylene carbonate (EC), dimethyl carbonate (DMC), diethyl carbonate (DEC), or ethyl-methyl carbonate (EMC). In addition, the electrolyte may be in liquid or gel form. In some examples, when an inorganic solid electrolyte is used, the electrolyte may be omitted.

The first terminal 120 may be made of a metal, and may be electrically connected to the first electrode plate 111. In some examples, the first terminal 120 may include a first current collector plate 121, a first terminal pillar 122, and a first terminal plate 123.

In some examples, the first current collector plate 121 may be in contact with the first electrode uncoated portion 111a protruding from one end of the electrode assembly 110. Substantially, the first current collector plate 121 may be welded to the first electrode uncoated portion 111a. In some examples, the first current collector plate 121 may be formed in an approximately "L" shape. In some examples, the first terminal pillar 122 may be integrally formed on the first current collector plate 121, or the first terminal pillar 122 may be separately provided to be riveted and/or welded to the first current collector plate 121. For example, the first current collector plate 121 may be made of copper or a copper alloy. In addition, as a method for welding the first current collector plate 121 to the first electrode uncoated portion 111a, laser welding having a dual beam structure and wobble structure may be used, which will be described later.

In some examples, the first terminal pillar 122 may protrude from a top of the first current collector plate 121, and may extend upwardly a predetermined length through the cap plate 151 to be described later. The first current collector plate 121 may be electrically connected to the first current collector plate 121 from the lower portion of the cap plate 151. In addition, in some examples, the first terminal pillar 122 may include a flange 122a extending along the length direction of the cap plate 151 to prevent the first terminal pillar 122 from falling out. The first terminal pillar 122 may be integrally formed with the first current collector plate 121, or may be riveted and/or welded after being inserted into the first current collector plate 121. In some examples, the first terminal pillar 122 may be electrically insulated from the cap plate 151. For example, the first terminal pillar 122 may be made of copper, a copper alloy, aluminum, or an aluminum alloy.

The first terminal plate 123 may be coupled to a top of the first terminal pillar 122, e.g., so the upper insulating member 162 may be interposed between a lower surface of the first terminal plate 123 and an upper surface of the cap plate 151. The first terminal plate 123 may include a hole 123a therethrough, to which the first terminal pillar 122 may be coupled and riveted and/or welded. In some examples, an interface between the first terminal pillar 122 exposed upward and the first terminal plate 123 may be welded to each other. In addition, a method for welding the first terminal pillar 122 to the first terminal plate 123 may include laser welding having a dual beam structure and laser welding having a wobble structure, which will be described later.

In addition, in some examples, a bus bar made of aluminum or an aluminum alloy may be welded to the first terminal plate 123. Thus, a plurality of secondary batteries may be connected to one another in series or in parallel.

The second terminal 130 may also be made of a metal, and may be electrically connected to the second electrode plate 112. In some examples, the second terminal 130 may include a second current collector plate 131, a second terminal pillar 132, and a second terminal plate 133. The structures of the second current collector plate 131, the second terminal pillar 132, and the second terminal plate 133 may be substantially the same as those of the first current collector plate 121, the first terminal pillar 122, and the first terminal plate 123, respectively.

In detail, the second current collector plate 131 may be in contact with the second electrode uncoated portion 112a that protrudes from one end of the electrode assembly 110. In addition, as a method for welding the second current collector plate 131 to the second electrode uncoated portion 112a, laser welding having a dual beam structure sand a wobble structure may be used, which will be described later. For example, the second terminal pillar 132 may be integrally formed on the second current collector plate 131, or the second terminal pillar 132 may be separately provided to be inserted into the second current collector plate 131 and coupled thereto. The second current collector plate 131 may be made of, e.g., aluminum or an aluminum alloy. The second terminal pillar 132 may pass through the cap plate 151 to be described later to protrude and extend upward a predetermined length, and may be electrically connected to the second current collector plate 131 from the lower portion of the cap plate 151. The second terminal pillar 132 may protrude and extend a predetermined length to the upper portion of the cap plate 151, and, at the same time, may include a flange 132a that prevents the second terminal pillar 132 from falling out of the lower portion of the cap plate 151. In the second terminal pillar 132, a region positioned below the flange 132a may be inserted into the second current collector plate 131 and then riveted and/or welded. For example, the second terminal pillar 132 may be made of aluminum or an aluminum alloy.

For example, the second terminal plate 133 may include a hole 133a, and the second terminal pillar 132 may be coupled to the hole 133a. In addition, the second terminal pillar 132 and the second terminal plate 133 may be riveted and/or welded to each other. In addition, a method for welding the second terminal plate 133 to the second terminal plate 133 may be laser welding having a dual beam structure and a wobble structure, which will be described later.

In addition, by welding a bus bar, e.g., made of aluminum or an aluminum alloy, to the second terminal plate 133, a plurality of secondary batteries may be connected to one another in series or in parallel. In some examples, the second terminal plate 133 may be electrically connected to the cap plate 151, and thus the cap plate 151 and the case 140, to be described below, have the same polarity as the second terminal 130 (e.g., a positive electrode).

The cap assembly 150 may be coupled to the case 140. In some examples, the cap assembly 150 may include the cap plate 151. The cap plate 151 seals the space of the case 140, and may be formed of the same material as the case 140. In some examples, the cap plate 151 may be coupled to the case 140 by laser welding. In some examples, since the cap plate 151 may have the same polarity as the second terminal 130, the cap plate 151 and the case 140 may have the same polarity.

In some examples, the cap plate 151 may include a through-hole through which the first terminal pillar 122 and the second terminal pillar 132 respectively pass. In some examples, the cap plate 151 may further include an injection hole 151c into which the electrolyte is injected, and a vent hole 151d in which the safety vent 153 is installed. In some examples, the plug 152 may block the injection hole 151c so that the electrolyte contained inside the case 140 may not leak. In some examples, the plug 152 may be laser-welded to the cap plate 151 after being coupled to the injection hole 151c. In some examples, the safety vent 153 blocks the vent hole 151d, and when the internal pressure of the case 140 is higher than a set pressure, the internal high-pressure gas may be discharged to the outside. In some examples, the safety vent 153 may be laser-welded to the cap plate 151 after being coupled to the vent hole 151d.

In some examples, an insulating seal gasket 161 may be interposed between the first terminal pillar 122 and the through-hole of the cap plate 151. That is, the insulating seal gasket 161 may be formed inside the through-hole of the cap plate 151, and the first terminal pillar 122 may protrude upwardly through the through-hole of the insulating seal gasket 161. In some examples, the insulating seal gasket 161 may be extend from the through-hole of the cap plate 151 to be positioned between the first current collector plate 121 and the cap plate 151. In addition, in some examples, the upper insulating member 162 may be interposed between the first terminal plate 123 and the cap plate 151. Accordingly, the first terminal 120 may be electrically insulated (e.g., separated) from the cap plate 151.

In some examples, an insulating seal gasket 171 may be interposed between the second terminal pillar 132 and the through hole of the cap plate 151. That is, the insulating seal gasket 171 may be formed inside the through-hole of the cap plate 151, and the second terminal pillar 132 may protrude upward through the through-hole of the insulating seal gasket 171. In addition, in some examples, the connecting member 180 may be interposed between the second terminal plate 133 and the cap plate 151. Accordingly, the second terminal 130 may be electrically connected to the cap plate 151.

Figure 3A:
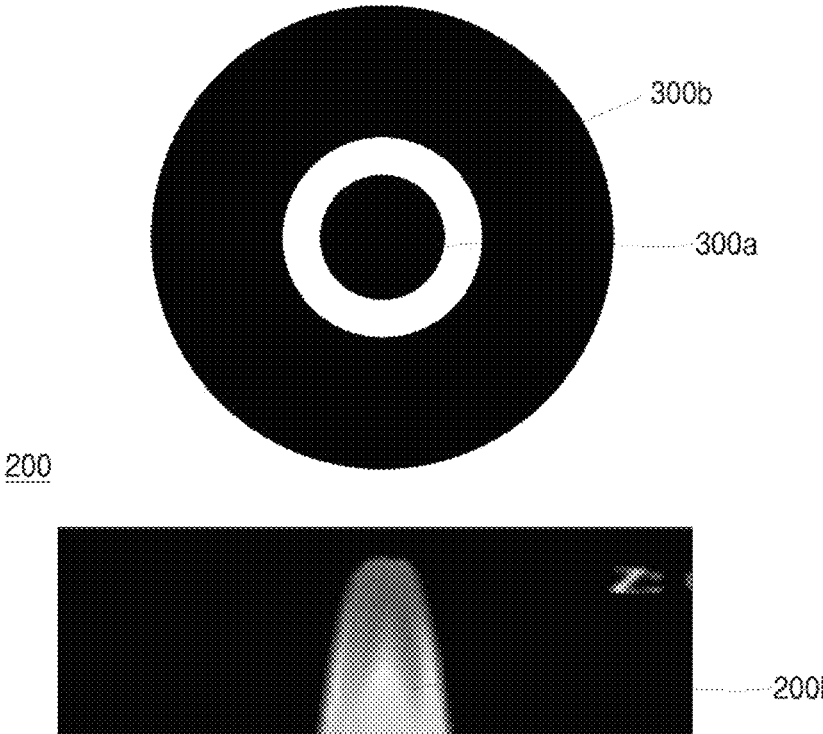
FIGS. 3A and 3B show a laser beam used in a secondary battery according to an embodiment of the present disclosure.
Figure 3B:
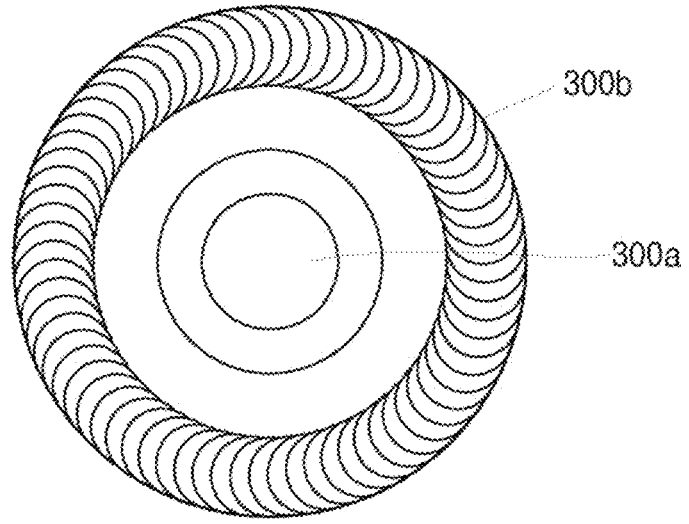

Hereinafter, a welding method used in a secondary battery according to an embodiment of the present disclosure will be described in more detail with reference to FIGS. 3A and 3B. FIGS. 3A and 3B show a laser beam used in the secondary battery 100 according to an embodiment of the present disclosure.

FIG. 3A illustrates an image of a laser beam having a dual beam structure and a top schematic representation of an area welded by the dual beam structure. FIG. 3B illustrates a top schematic representation of a laser welding having a wobble structure performed after the dual beam welding.

In detail, the dual beam structure of FIG. 3A may be primarily applied to a welding structure of a secondary battery, e.g., the above-described welding between the first current collector plate 121 and the first electrode uncoated portion 111a, between the first terminal pillar 122 and the first terminal plate 123, between the second current collector plate 131 and the second electrode uncoated portion 112a, and between the first terminal plate 123 and the second terminal plate 133. However, such a welding structure may also be used in welding used for coupling other components required for manufacturing a secondary battery according to an embodiment of the present disclosure in addition to welding between the present components. For example, the welding structure of the present disclosure may also be applied to welding between the case 140 and the cap plate 151 among the components of the secondary battery.

Referring to FIG. 3A, a dual beam structure 200 (e.g., a dual beam laser) may include a first part 200a having a central circular shape and a second part 200b surrounding the first part 200a in an annular shape, e.g., the first and second parts 200a and 200b may be concentric. In the first part 200a, the laser beam is concentrated to have a relatively high energy density (e.g., the darker center in the image of FIG. 3A), and in the second part 200b, the laser beam is formed along an annular shape to have a lower energy density than in the first part 200a (e.g., the lighter part surrounding the darker center in the image of FIG. 3A).

When the dual beam structure 200 (e.g., a dual beam laser) is applied to a predetermined region, the welded region may have a first area 300a having a central circular shape (corresponding to the first part 200a of the dual beam) and a second area 300b surrounding the first area 300a in an annular shape (corresponding to the second part 200b of the dual beam). The dual beam structure 200 may move along the interface of the components to be welded or the welding surface in an overlapping state, thereby welding the components. For example, the dual beam structure 200 may apply two beams simultaneously, via the first and second parts 200a and 200b with their corresponding energy densities, to have the first and second areas 300a and 300b, e.g., the first and second areas 300a and 300b may be concentric and spaced apart from each other. For example, the first and second areas 300a and 300b may be formed at an interface between any two components of the secondary battery 100 that are coupled to each other by the dual beam welding, e.g., at an interface between the first current collector plate 121 and at least one of the electrode assembly 110 and the first terminal 120.

Next, as shown in FIG. 3B, after welding via the dual beam structure 200, welding using a wobble technique may be secondarily performed along a welded region corresponding to the second area 300b. In the wobble technique, welding is performed while drawing a substantially circular arc, so additional welding may be performed along, e.g., at least part of, the second area 300b. For example, the wobble welding may be applied only to the second area 300b to form a wobble area in the second area 300b, e.g., a wobble area (e.g., region with repeated arcs along a circumference in FIG. 3B) in the second area 300b at the interface between the first current collector plate 121 and at least one of the electrode assembly 110 and the first terminal 120.

In particular, the wobble technique is a method for performing welding while rotating a laser spot at a high speed, and has the advantage of reducing spatters formed by minute keyholes. More specifically, the wobble technique can provide a desired welding effect while varying conditions, e.g., the size of the laser spot, a wobble diameter according to circular speeds, and the speed of linear welding along the second region. In addition, in the wobble technique, reduction of the laser spot increases the power density, thereby increasing welding efficiency of metals and stable formation of keyholes, which in turn, reduces formation of spatter and a heat affected zone (HAZ), e.g., causes less deformation.

As such, when the dual beam as the first welding and the wobble technique as the second welding are applied, e.g., sequentially to a same area, the welding reliability is increased for the components to be welded. In particular, generation of metal foreign substances, e.g., spatter, may be reduced. Accordingly, the reliability and lifespan of the secondary battery manufactured by using the present welding may be improved.

Hereinafter, a welding region in a secondary battery according to an embodiment of the present disclosure will be described in more detail with reference to FIGS. 4 to 5B.

Figure 4:
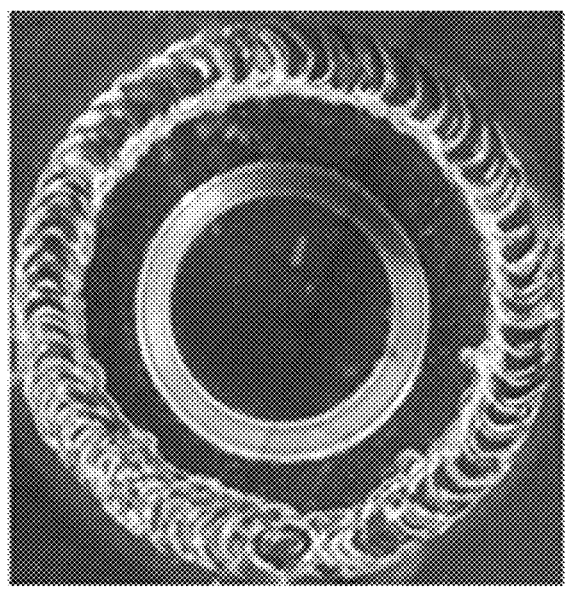
FIG. 4 is an image showing a welding area used in a secondary battery according to an embodiment of the present disclosure.

FIG. 4 is an image showing a welding area used in a secondary battery according to an embodiment of the present disclosure. FIG. 4 corresponds to FIG. 3B.

Figure 5A:
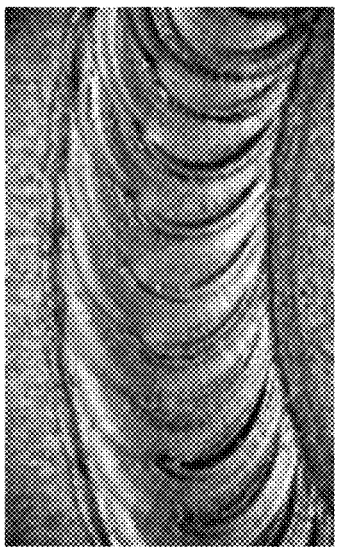
FIGS. 5A and 5B are enlarged images showing a welding area used in a secondary battery according to an embodiment of the present disclosure.
Figure 5B:
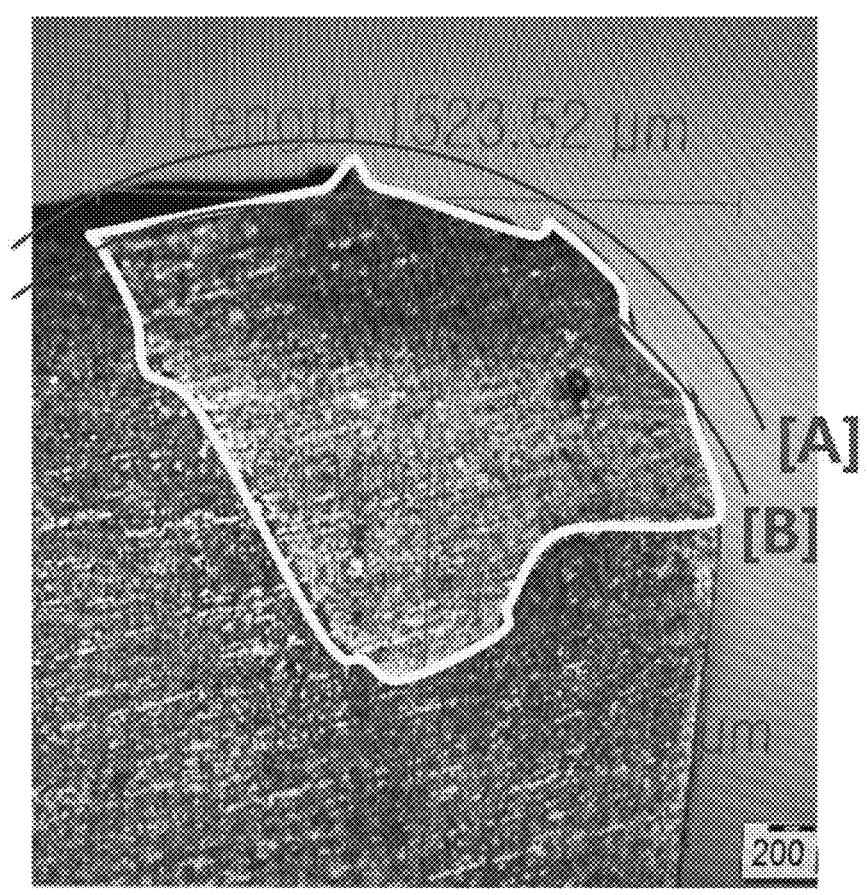

FIGS. 5A and 5B are enlarged images showing a welding area used in a secondary battery according to an embodiment of the present disclosure. FIGS. 5A and 5B str enlarged portions of FIG. 4, to which both the dual beam and the wobble technique were applied.

In detail, referring to FIG. 5B, the sawtooth shape generated by the wobble technique is shown as an enlarged view. Here, in the wobble technique, since the focus of the laser beam is rotated, a wave bead having a sawtooth shape may be formed along the radius of rotation. In addition, in the sawtooth shape, a diameter difference between the outer sawtooth portion (A) and the inner sawtooth portion (B) may be greater than or equal to 5 μm. When the diameter difference is greater than or equal to 5 μm, there is an advantage in that the coupling strength is increased in the welding region formed according to the wobble technique.

Hereinafter, a material that can be used for a secondary battery according to an embodiment of the present disclosure will be described in more detail.

Figure 6:
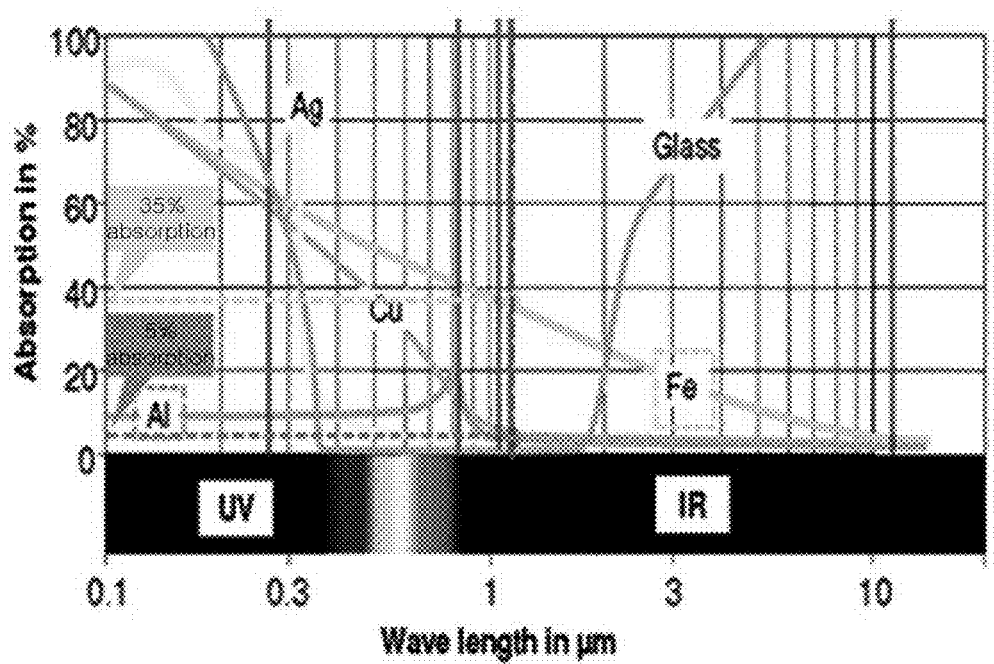
FIG. 6 is a graph showing the absorption rate of the laser beam according to materials used.

FIG. 6 is a graph showing the absorption rate of the laser beam according to materials used.

Referring to FIG. 4 and FIG. 6, the relationship between the absorption rate of each metal material and the wavelength band of the laser beam can be confirmed, and the material of the object to be welded and the wavelength of the laser beam to be used can be determined in consideration of the absorption rate. For example, in the case of copper (Cu), the absorption rate is high at a short wavelength, but the absorption rate tends to decrease gradually as the wavelength becomes longer, and the absorption rate drops to about 5% in the infrared (IR) region.

In another example, in the case of aluminum (Al), there is little change in the short wavelength band, but the absorption rate gradually increases in the visible ray region, and the absorption rate in the red visible ray tends to decrease again after showing the maximum absorption rate. In addition, it can be seen that the absorption rate drops to about 5% in the infrared (IR) region.

In yet another example, in the case of iron (Fe), it can be seen that the absorption rate gradually decreases as the wavelength increases from infrared to visible light. The absorption rate is 35% in a wavelength band of about 1 μm.

Therefore, in the secondary battery according to embodiments of the present disclosure, welding between dissimilar metals, e.g., different metals, may be applied, and it is possible to select a laser beam of an appropriate wavelength band according to a material of each component. For example, in the case of welding dissimilar metals, e.g., copper (Cu) and aluminum (Al), which are often used for negative electrodes and positive electrodes respectively, it is possible to perform welding using laser beams in the red visible light and surrounding wavelengths, which have similar absorption rates.

In addition, in the secondary battery according to the embodiment of the present disclosure, along with the wavelength band of the optimal absorption, the dual beam and the wobble technique are applied together, e.g., to a same region, thereby increasing welding quality by reducing generation of foreign substances while increasing the coupling force during welding of various components.

By way of summation and review, example embodiments provide a secondary battery capable of increasing welding quality. That is, as described above, the secondary battery according to the present disclosure can increase the welding quality by reducing the generation of foreign substances while increasing the coupling force during welding of each configuration by applying dual beam and wobble technique together, e.g., sequentially to a same region of at least part of the welded area.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
an electrode assembly;
a current collector coupled to the electrode assembly;
a case accommodating the electrode assembly and the current collector;
a cap plate coupled to the case, the cap plate sealing the electrode assembly and the current collector in the case; and
a terminal plate connected to the current collector, the terminal plate being exposed through the cap plate,
wherein the current collector is welded to at least one of the electrode assembly and the terminal plate by both a dual beam welding and a wobble welding,
wherein an interface between the current collector and the at least one of the electrode assembly and the terminal plate includes a first welding area having a circular shape and a second welding area having an annular shape spaced apart from and surrounding the circular shape, and
wherein the interface between the current collector and the at least one of the electrode assembly and the terminal plate further includes a wobble welding area only on the second welding area among the first welding area and the second welding area.

2. The secondary battery as claimed in claim 1, wherein the interface between the current collector and the at least one of the electrode assembly and the terminal plate includes in the wobble area shapes of a wave bead with repeated sawtooth shapes.

3. The secondary battery as claimed in claim 2, wherein, in the sawtooth shapes, a diameter difference between an outer sawtooth portion and an inner sawtooth portion is greater than or equal to 5 μm.

4. The secondary battery as claimed in claim 1, wherein the case and the cap plate are coupled to each other by both the dual beam welding and the wobble welding.

5. The secondary battery as claimed in claim 1, wherein the current collector includes a different metal than the electrode assembly and the terminal plate.

6. A method of fabricating a secondary battery, the method comprising:
forming an electrode assembly;
forming a current collector to be coupled to the electrode assembly;
accommodating the electrode assembly and the current collector in a case;
forming a cap plate sealing the case, such that the electrode assembly and the current collector are inside the case; and
forming a terminal plate to be connected to the current collector, such that the terminal plate extends through the cap plate to be exposed to an exterior of the case,
wherein the current collector is welded to at least one of the electrode assembly and the terminal plate by sequentially performing a dual beam welding and a wobble welding in a same region.

7. The method as claimed in claim 6, wherein welding by the dual beam welding includes forming a first area and a second area at an interface between the current collector and the at least one of the electrode assembly and the terminal plate, the first area being formed at a center, and the second area being formed around the first area.

8. The method as claimed in claim 7, wherein the first area has a circular shape, and the second area has a ring shape.

9. The method as claimed in claim 7, wherein the wobble welding is performed only along the second area among the first area and the second area.

10. The method as claimed in claim 6, wherein the wobble welding is performed only along an edge of the second area formed by the dual beam welding while forming repeated arcs.

11. The method as claimed in claim 6, wherein welding by the wobble welding includes forming shapes of a wave bead having repeated sawtooth shapes.

12. The secondary battery as claimed in claim 11, wherein, in the sawtooth shapes, a diameter difference between an outer sawtooth portion and an inner sawtooth portion is greater than or equal to 5 μm.

13. The method as claimed in claim 6, wherein the dual beam welding and the wobble welding are further performed between the case and the cap plate.

14. The method as claimed in claim 6, wherein the current collector is formed of a different metal than the electrode assembly and the terminal plate.

15. The method as claimed in claim 7, wherein energy densities of the first and second areas are different from each other.

16. The method as claimed in claim 15, wherein an energy density of the second area is smaller than the energy density of the first area.

17. The method as claimed in claim 7, wherein an area of the first area and an area of the second area are different from each other.

18. The method as claimed in claim 17, wherein the area of the first area is smaller than the area of the second area.

19. The secondary battery as claimed in claim 1, wherein energy densities of the first welding area and the second welding area are different from each other.

20. The secondary battery as claimed in claim 19, wherein the energy density of the second welding area is smaller than the energy density of the first welding area.

*  *  *  *  *